United States Patent
Oord et al.

(10) Patent No.: US 12,280,957 B2
(45) Date of Patent: Apr. 22, 2025

(54) BAR TAPE

(71) Applicant: ARNOLD JÄGER HOLDING GMBH, Hannover (DE)

(72) Inventors: Johan Oord, Groningen (NL); Sebastian Jäger, Hannover (DE); Johan E. Adrichem, Uitgeest (NL)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 210 days.

(21) Appl. No.: 18/131,525

(22) Filed: Apr. 6, 2023

(65) Prior Publication Data
US 2024/0336439 A1    Oct. 10, 2024

(51) Int. Cl.
*B65G 15/48*    (2006.01)
*A01D 17/10*    (2006.01)

(52) U.S. Cl.
CPC .............. *B65G 15/48* (2013.01); *A01D 17/10* (2013.01); *A01D 2017/103* (2013.01)

(58) Field of Classification Search
CPC ... B65G 15/48; A01D 17/10; A01D 2017/103
See application file for complete search history.

(56) References Cited

U.S. PATENT DOCUMENTS

| | | | | |
|---|---|---|---|---|
| 9,033,139 B2 * | 5/2015 | Jager | ....................... | B65G 17/42 198/850 |
| 11,926,479 B2 * | 3/2024 | Christian | ............... | B65G 15/50 |

FOREIGN PATENT DOCUMENTS

| | | |
|---|---|---|
| DE | 2715108 A1 | 10/1978 |
| DE | 3737066 A1 | 6/1989 |
| DE | 19520927 A1 | 12/1996 |
| DE | 20011436 U1 | 10/2000 |
| DE | 202007015687 U1 | 2/2008 |
| EP | 0664074 A1 | 7/1995 |
| EP | 2813135 B1 | 5/2018 |
| WO | 1995023497 A1 | 9/1995 |

* cited by examiner

*Primary Examiner* — Kavel Singh
*Assistant Examiner* — Lester Rushin, III
(74) *Attorney, Agent, or Firm* — Barnes & Thornburg LLP

(57) ABSTRACT

A rod belt for agricultural machines includes at least three belts, fasteners, and rods. The at least three belts are pull-resistant, elastic, and continuous, and run parallel to one another. The at least three belts each extend in a direction of movement. The fasteners are connected to the belts. The rods are arranged perpendicular to the direction of movement and are parallel to one another.

15 Claims, 8 Drawing Sheets

Figure 1:
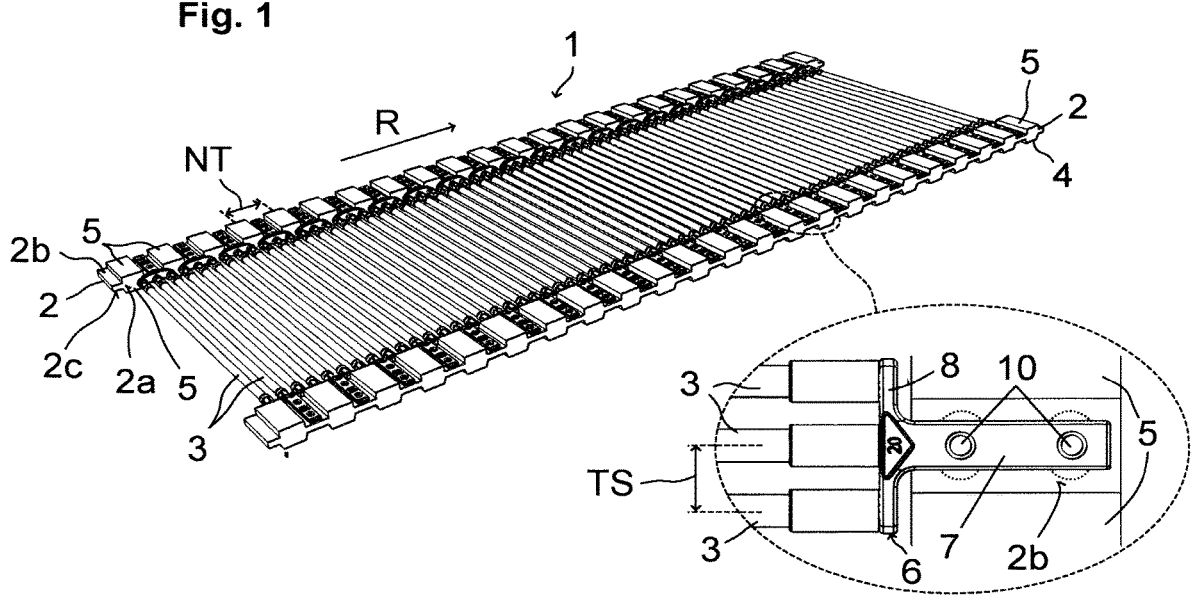

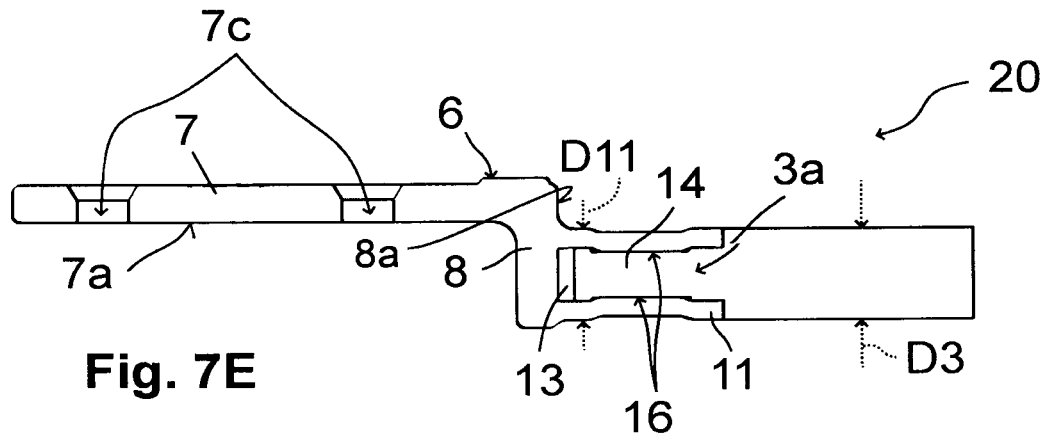
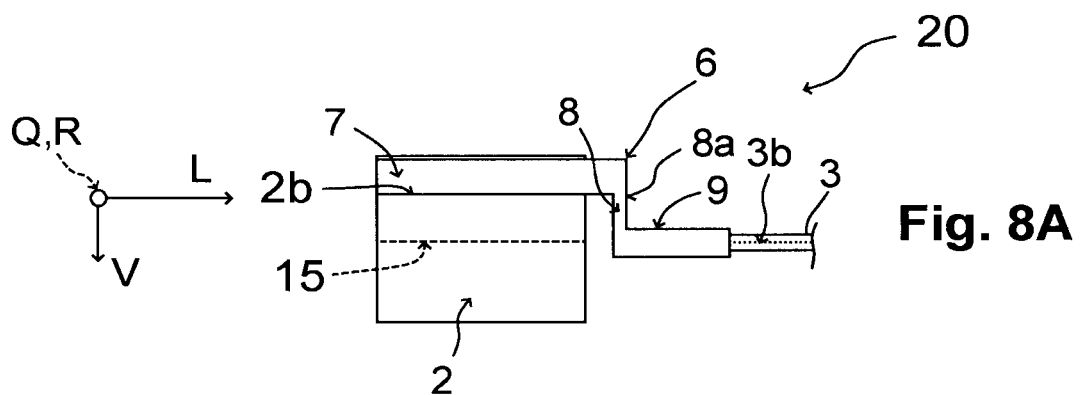
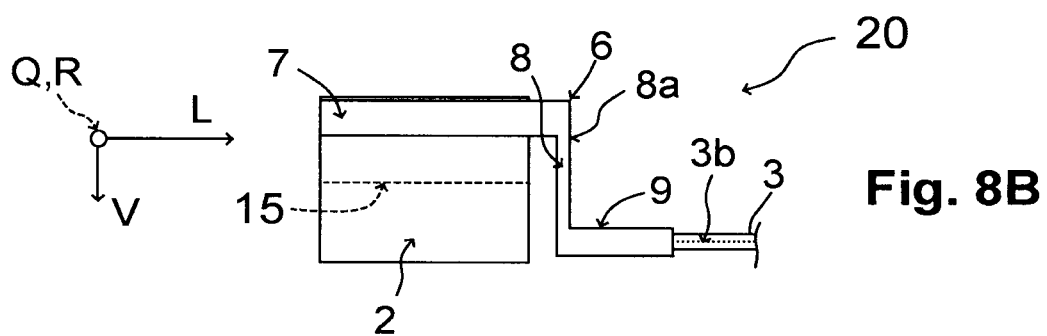

BAR TAPE

The invention relates to a rod belt according to the preamble of claim 1.

Rod belts for rod belt conveyors of agricultural machines are constructed, for example, as disclosed in the document DE 195 20 927 A1. Rod belts of this type comprise two or more pull-resistant elastic and continuous (endless) belts running parallel to one another which are interconnected via a plurality of rods that are arranged perpendicular to the direction of movement of the rod belt and parallel to one another. For affixing the rods on the belt, the rods comprise flattened and perforated support areas by means of which they lie in contact with the belts. The connection of the support areas with the belts is made by rivets or similar fastening means permeating the support area and the belts.

Further rod belts for agricultural machines have been disclosed in the documents DE 27 15 108 A1, WO 95/23497 A1, DE 20 2007 015687 U1 and DE 37 37 066 A1. Further, in DE 200 11 436 U1 or EP 2 813 135 B1, rod belts have been described, wherein the rods are not directly connected at their ends to the belts but, rather, each via an end piece forged from round steel with sleeves or sockets welded onto these or, respectively, a fastener designed as a stamped bended part. The fasteners comprise a flattened and perforated support area which transitions into an intermediate area in the shape of a cranked section extending upwards from the upper side of the belt or, respectively, an elbow angled downwards. In the citation DE 200 11 436 U1 a fixing area for receiving the rod ends in the shape of a sleeve is attached to the cranked section, while in EP 2 813 135 B1 it is the angled piece directly that serves as fixation, whereby the rods are inserted into it through holes in the angled piece. The support areas of the fasteners lie in contact with the upper side of the belts and are affixed thereto by means of rivets. The rods are made of plastics and are affixed to the respective fixation area by clamping or riveting.

Hereby, it is a disadvantage that the process of making the forged and cranked end segment according to DE 200 11 436 U1 is very complex and some screening surface is lost by the upwards cranking and also there will be no lateral boundary of the screening surface. Moreover, a perpendicular cranking for the round steel forged therein is not possible so that screening surface is lost. In EP 2 813 135 B1 it is also disadvantageous that the transition between the rod and the sheet formed angular piece is not very stable so that the rod cannot be kept securely affixed to the angular piece in the event of higher bending moments in the operation of the rod belt. Thus, in such a sheet shaped element the stability will be lower altogether thereby jeopardizing continued operation. Furthermore, increased temperatures on the belt are directly transferred to the rods.

The document EP 0 664 074 A1 further provides for the rods to lie on top of one another and overlap at their ends in the region of the inner belt, thereby providing a form fit resistant against lateral forces, for example, by means of a complementary shape, for example, convex and concave, or overlapping sections being stepped. A disadvantage hereby is that the processing required at the ends of the rods is complex and, moreover, a direct attachment of the rods to the belts is complex and provides less stability.

Therefore, it is the object of the invention to provide a rod belt which is simple and affordable to produce while also providing high stability or robustness in the joining.

This task is solved by a rod belt according to claim 1. Hereby, preferred further developments are specified in the sub-claims.

Accordingly, what is provided is a rod belt for agricultural machines having rods arranged perpendicular to the direction of movement and parallel to one another, each running between two of the belts, where the rods are each held at their rod ends by fasteners connected to the respective belts. Hereby the fasteners exhibit a support area extending in a longitudinal direction via which the respective fastener is attached to the respective belt of the rod belt. To that end, the support area is provided at least one hole into which a fastening means, e.g., a rivet, protrudes which also penetrates the belts. Hereby, in the region of the perforation the support area may be widened in a transverse direction. This ensures that the support area is not weakened in the region of the hole, thereby maintaining a nearly constant geometrical moment of inertia across the support area.

The rods are held on an intermediate area which is connected one-piece with the support area of the respective fastener. Hereby, one intermediate area may hold one rod or also two, three or more rods there by allowing a rod pitch between the rods of the rod belt to be adjusted to be smaller than a cam pitch between cams on the underside and/or cams on the upper side on the respective belt.

The invention provides that two of the fasteners are positioned and affixed on an inner belt with their support areas lying on top of one another in such a manner that the respective intermediate areas on the two overlying support areas face to different belt outsides of the inner belt, and, therefore, the rods held by them extend in opposite directions starting from the inner belt. Inner belt is to be understood as referring to any belt of the rod belt lying between the two outermost belts. Thus, a rod belt may have more than one inner belt, when more than three belts running parallel to one another are provided.

Thus, what is provided is a middle belt attachment of the respective rods, where the rod end of the rods themselves are not directly attached to the inner belt but, rather, via the fasteners. Thus, the ends of the rods require no processing or reshaping. Thus, a heating process of forging the rod ends can be omitted, simplifying the process of manufacturing. Moreover, the attachment of the rods on the inner belt via the fastener is more robust and more flexible.

By virtue of the overlying arrangement of the fasteners and the intermediate areas made one-piece therewith according to the invention it is further achieved that there will be a nearly constant geometrical moment of inertia at least up to the intermediate area to the rods, increasing robustness and stability in the region of the inner belt of the rod belt during operation. Moreover, the process of manufacturing fasteners is simplified because they have to be made each having only one intermediate area for receiving the respective rods.

Preferably, it is further provided that longitudinal axes of the rods held on the respective intermediate area directly and/or via the respective socket run below the support area of the respective fastener as well as below a belt upper side of the belt, where the longitudinal axes of the respectively held rods preferably run in the plane of a neutral fiber of the inner belt or above or below the plane of the neutral fiber of the inner belt, in particular, in an area of +/−2 mm around the neutral fiber.

Shifting the rods into the neutral fiber increases, in particular, the overall stability of the rod belt because torsional moments on the rod ends or their riveting respectively are avoided. Moreover, the exact rod pitch and thereby the desired sieving effect is maintained across the entire belt length including, in particular, the deflection points, as well as jamming of plant material or foreign objects is avoided.

Also, because the direction of the angular deflection is downwards an optimized screen surface is created between the belts, where the intermediate areas at the fasteners together with the inner belts can act as lateral boundaries for the transported goods.

Preferably, it is further provided that the intermediate areas of the two overlying fasteners are arranged on the respective support area in such a way that at least two of the rods held by them and extending in opposite directions are approximately aligned, where the longitudinal axes of the rods extending in opposite directions differ from each other by a maximum of 3 mm, so as to allow for tolerances. Thus, an approximately identical installation position is attained for both sides of the middle belt so as to attain a secure deflection of the rod belt as well as a uniform sieving effect across the entire rod belt.

Preferably, surfaces of the overlying support areas facing each other are in contact with one another, in particular, with precision fit, so that any relative movements of the two fasteners in operation of the rod belt can be avoided. This can be achieve by various measures, where it may be provided that the surfaces of the overlying support areas facing each other are arched in a manner complementary to each other, preferably arched perpendicular to the longitudinal axis, and/or a groove and pin combination is formed on the surfaces facing each other so as to quench force peaks, and/or the surfaces of the overlying support areas facing each other are conically tapered in the longitudinal axis in a manner complementary to each other, and/or the surfaces of the overlying support areas facing each other are graduated in the longitudinal axis in a manner complementary to each other.

Hereby the respective rods may be attached to the intermediate area in such a way that the rod end of the respective rod is axially and in a rotation-proof manner affixed to the intermediate area, for example, by using a rivet connection, and/or in that a fastening area protrudes in a longitudinal direction away from the intermediate area, the fastening area being formed by at least one socket having an insertion opening extending across an insertion depth into which the rod end of the rod is inserted. Thus, a direct connection with the intermediate area can be established by means of a simple rivet connection, where an embodiment with a socket (in addition to or instead of) has the advantage that increased temperatures can be quenched and bending moments about the transverse axis or the longitudinal axis respectively as well as shearing forces can be quenched effectively.

Preferably, it is further provided that the respective fastener is manufactured totally or partially in a subtractive or additive manufacturing process, preferably using a metal material or a thermoplastic, or thermosetting polymer, for example in a milling process or 3D printing process, or as a molded part made of a metal material or of a thermoplastic, or thermosetting polymer. This allows manufacturing with little expenditure and at low energy cost. However, an embodiment as a one-piece molded part is also possible so that further manufacturing steps can be omitted. Alternatively, an additional reshaping process may be provided, for example, to bend off the intermediate area and/or to bring the sockets into the desired place relative to the belt. This allows, using the invention, to substitute the heating process of forging the rod ends, as shown in the state of the art, with a less complex, less energy-intensive assembling process.

Figure 2:
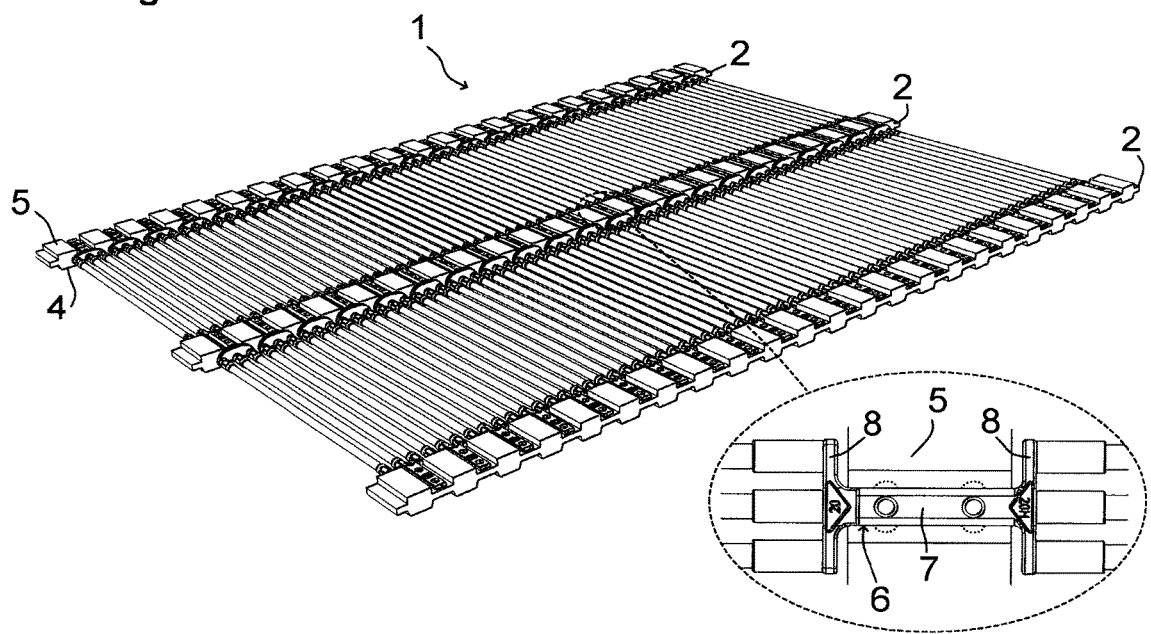
Figure 3:
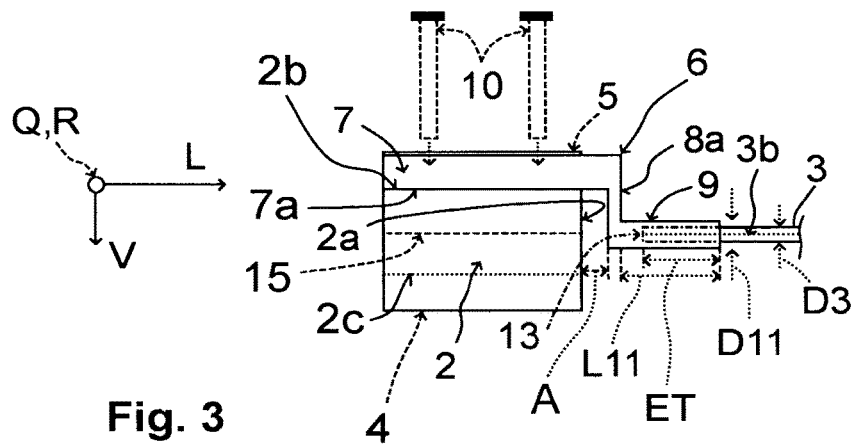
Figure 4:
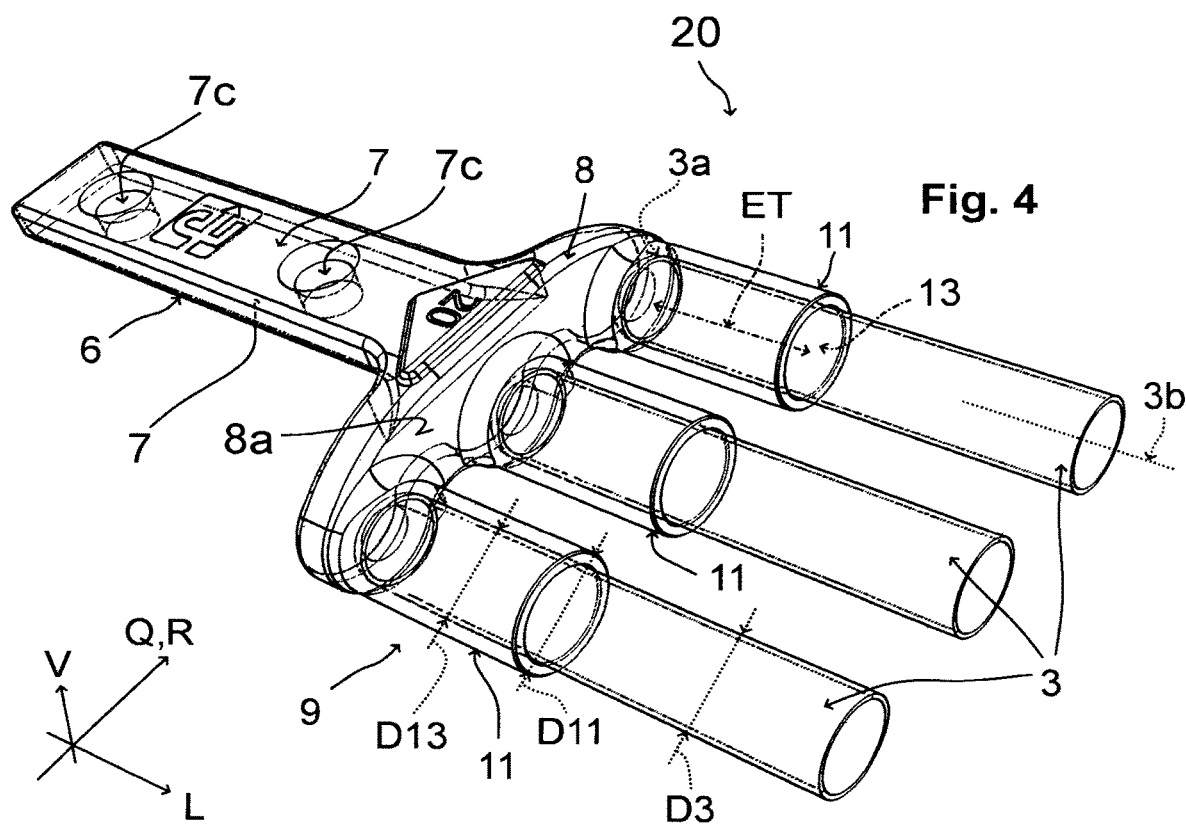
Figure 5:
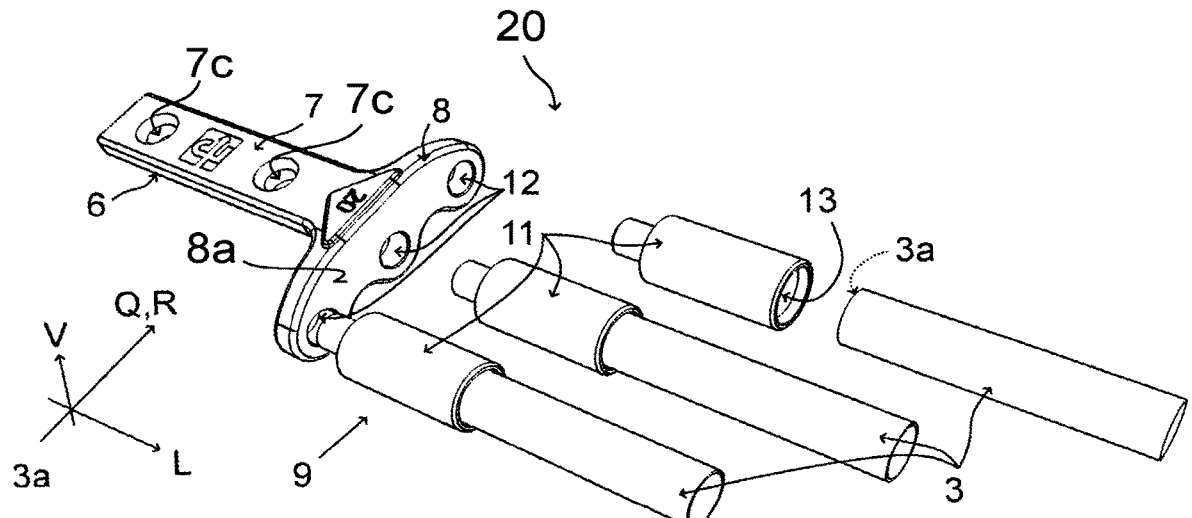
Figure 6:
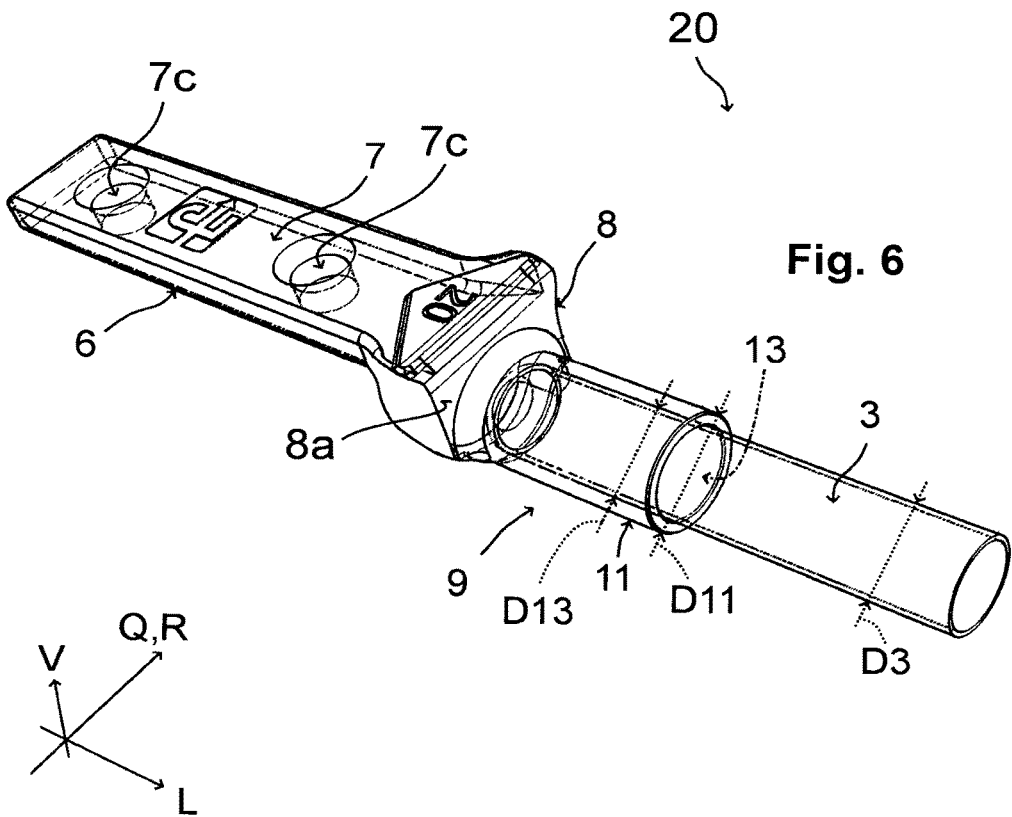
Figure 9A:
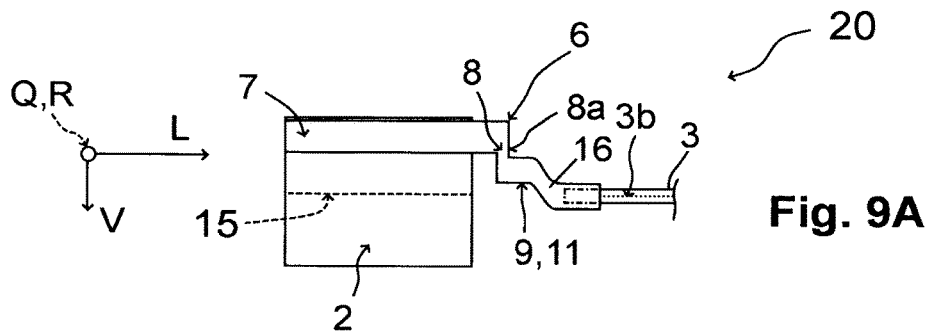
Figure 9B:
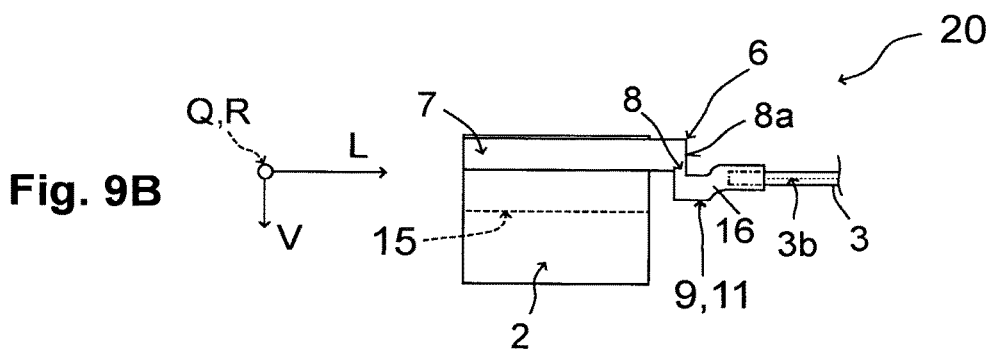
Figure 9C:
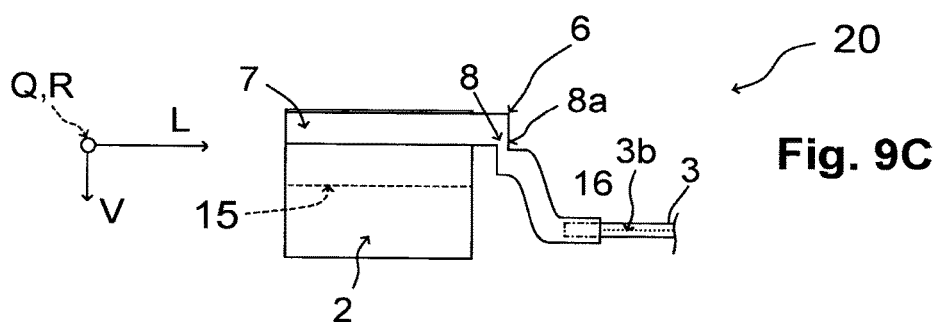
Figure 10:
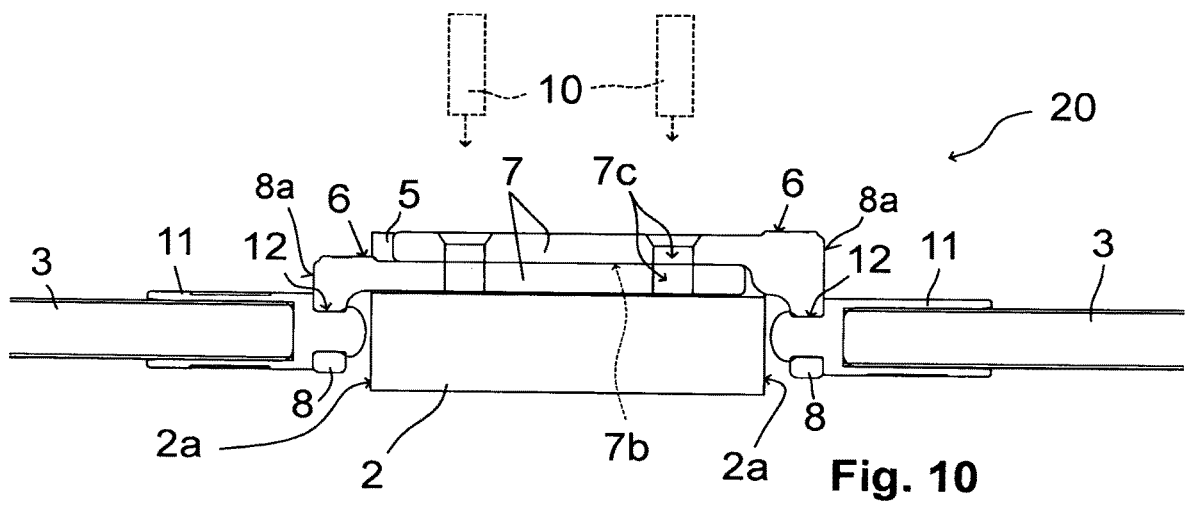
Figure 10A:
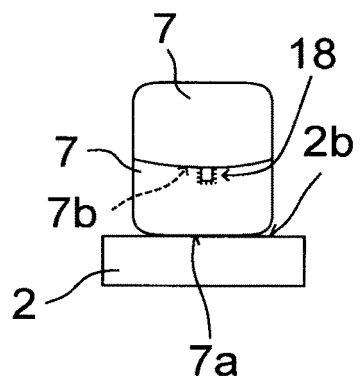
Figure 10B:
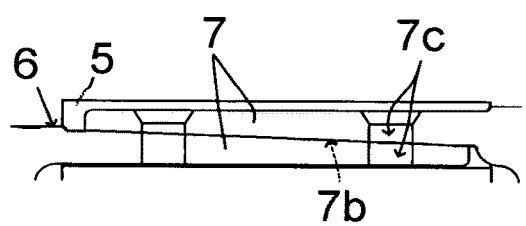
Figure 10C:
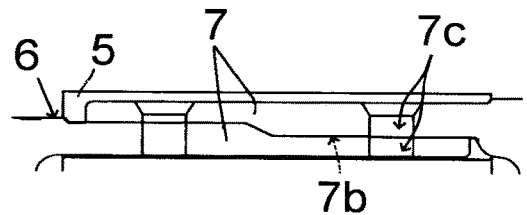
Figure 11:
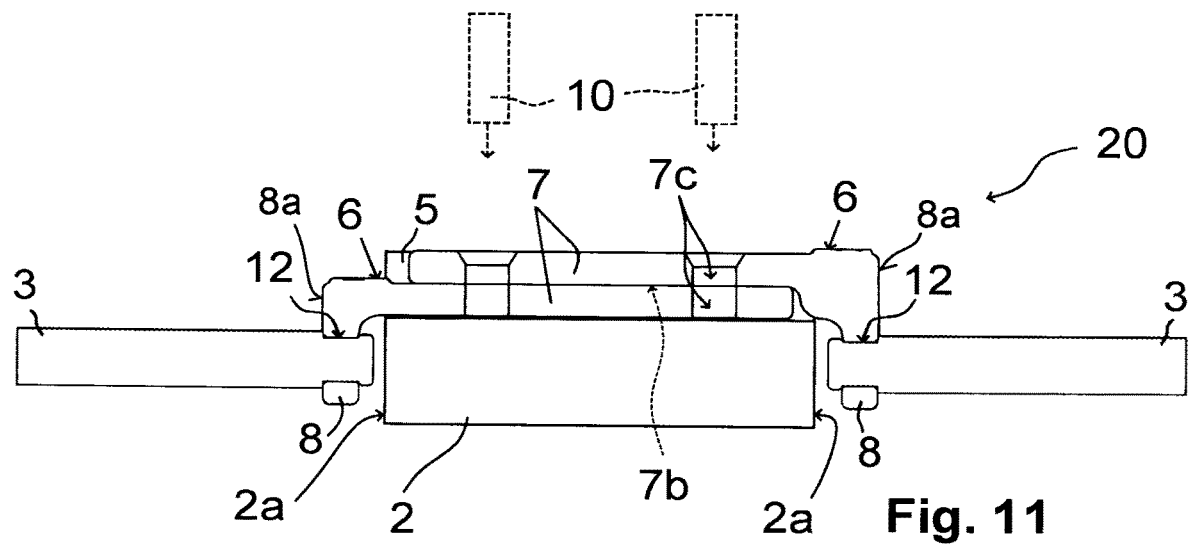
Figure 11A:
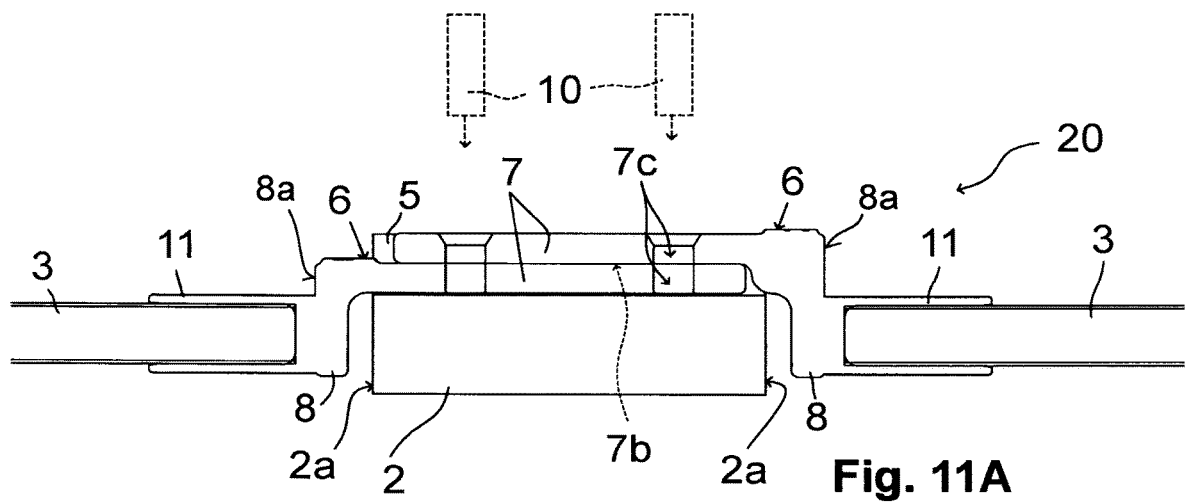
Figure 11B:
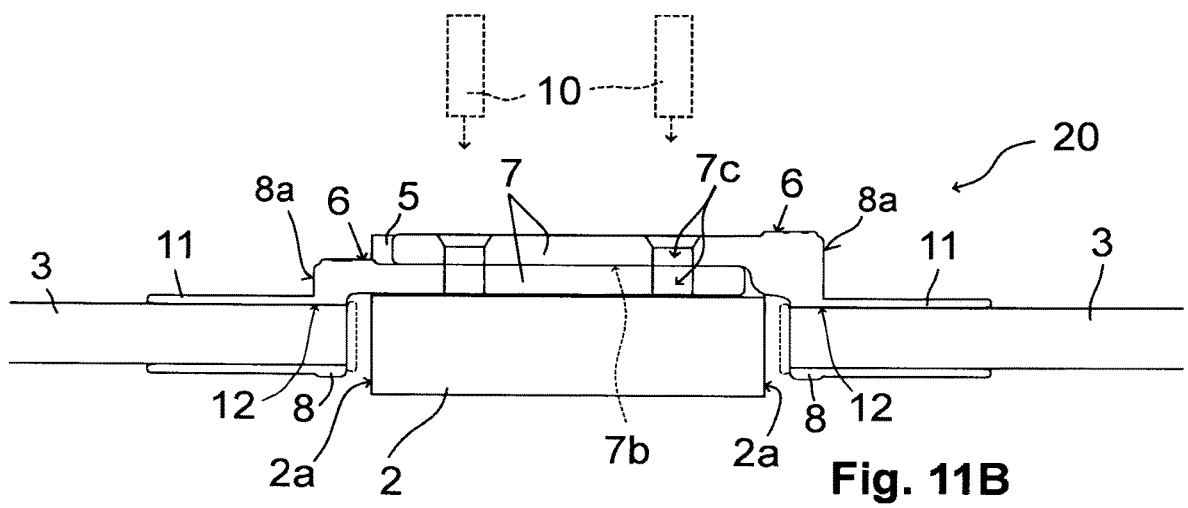

The invention is further illustrated by means of embodiment examples. It is shown in:

FIGS. 1, 2 rod belts having a plurality of rods extending perpendicular to the transport direction;

FIG. 3 a schematic view of a rod with a fastener;

FIG. 4 a first embodiment of the fastener for receiving three rods;

FIG. 5 a second embodiment of the fastener for receiving three rods;

FIG. 6 a third embodiment of the fastener for receiving a rod;

FIGS. 7A-7E further embodiments of the transition between a rod end of the rod and the fastener;

FIGS. 8A, 8B fasteners for various installation positions of the rods according to a first variant;

FIGS. 9A, 9B, 9C fasteners for various installation positions of the rods according to a second variant;

FIG. 10 fasteners on an inner belt of the rod belt;

FIGS. 10A, 10B, 10C various embodiments of the fasteners according to FIG. 10; and FIGS. 11, 11A, 11B further variants of the fasteners on an inner belt of the rod belt.

FIG. 1 shows a rod belt 1 made of two fabric layer reinforced (outer) belts 2 running parallel to one another, and running between them are a plurality of rods 3. In FIG. 2 shows an embodiment of the rod belt 1 in which, additionally, a middle or inner belt 2 runs in a middle region of the rod belt 1. The belts 2 are each designed as cam belts with a plurality of cams 4 on the underside and diametrically opposed cams 5 on the upper side, each spaced apart from one another at a pre-determined cam pitch TN.

The cams 4 on the underside serve to drive the rod belt 1 in a direction of movement R. To that end, drive means of drive wheels, not shown, engage with the gaps between the cams 4 on the underside. The cams 4 on the upper side serve to protect the fasteners 6 attached to the belt 2, a support side 7a of which lies in contact with a belt upper side 2b between the cams 5 on the upper side in a flat, preferably cuboid support area 7. Rod belt 1 designs of this type are known in the state of the art and will require no further illustration.

For the purpose of attaching the individual rods 3 to the respective belt 2 the fasteners 6 are provided which include, as schematically depicted in FIG. 3, a support area 7 extending in a longitudinal direction L (in relation to the fastener 6 or the rods 3), an intermediate area 8 running in an angled direction or, respectively in the vertical direction V in relation to the support area 7, and a fastening area 9. The support area 7, which is preferably designed flat so as not to project beyond the upper side cams 5, serves to apply and affix the respective fastener 6 onto a belt upper side 2b of the respective belt 2. Hereby, the attachment is made by means of fastening means 10, for example, rivets, or similar, running through or penetrating both the support area 7 through a perforation and the belt 2. Hereby, the support area 7 may be widened in a transverse direction Q or, respectively, direction of movement R in the region of the perforation 7c, as indicated by the dotted line in the sections in FIG. 1 and FIG. 2 by way of example. Hereby, it will be achieved that the support area 7 is not weakened in the region of the perforation 7c so that there will be a nearly constant geometrical moment of inertia at least across the support area 7. Owing to the design of the fasteners 6 described below, such a nearly constant geometrical moment of inertia can also be maintained at least up to the transition area to the rods 3.

The support area 7 transitions as one piece into the intermediate area 8 which is angled off downwards in the vertical direction V in the direction of a belt underside 2c. Hereby, the intermediate area 8 is designed non-circular or, respectively, it is fitted onto the support area 7 eccentrically or of-center in relation to a longitudinal axis thereof. For the fastener 6 on the outer belts 2, according to FIG. 1 or 2, the support area 7 transitions into the intermediate area 8 only on one side because only a one-sided attachment of the rods 3 is provided. In this embodiment, for the fastener 6 on the inner belts 2, according to FIG. 2, an intermediate area 8 is provided on both sides of the support area 7 which is connected thereto as one piece.

The respective intermediate area 8 extends in the vertical direction V, essentially perpendicular to the support area 7 so it is aligned in parallel to a belt outside 2*a*. A lateral surface 8*a* of the intermediate area 8 faces, starting from the support area 7, consistently in longitudinal direction L or, respectively, this lateral surface 8*a* runs essentially perpendicular to the longitudinal direction L. Hereby, the lateral surface 8*a* is assumed to be essentially level.

Hereby, a distance A between the intermediate area 8 and the belt outside 2*a* is preferably smaller than 10 mm, thereby optimizing the screening surface on the rod belt 1. The intermediate area 8 may, for example, even be in direct contact with the belt outside 2*a* (A≈0) so as a maximize the screening surface. Moreover, depending on the number of rods 3 per fastener 6 the respective intermediate area 8 with its lateral surface 8*a* will extend, in the manner of a strip, perpendicular to the support area 7 or to the rods 3 respectively, i.e., in a transverse direction Q or, respectively, in the direction of movement R of the respective belt 2.

The fastening area 9 joining thereto may have various designs. As shown in FIGS. 4 and 5, the fastening area 9 is formed by a plurality of cylindrical sleeves or sockets 11 each being connected to the intermediate area 8. Hereby, the sockets 11 project away from the lateral surface 8*a* perpendicularly in the longitudinal direction L. This means that the sockets 11 and the flat support area 7 run parallel to one another in the longitudinal direction L and project away from the intermediate area 8 in opposite directions.

The sockets 11 are preferably made one-piece with the intermediate area 8 and the support area 7 so that, overall, a one-piece fastener 6 is provided. To that end, the fastener 6 may, for example, be formed in a subtractive or additive manufacturing process, for example, in a milling process or 3D printing process or similar, using metal materials or thermoplastic, or thermosetting polymers. Furthermore, a molding process may be provided, using the same materials, to provide the fastener 6 as a metal molded part. In this embodiment, only one manufacturing step is required thereby overall simplifying the manufacturing process. Moreover, the heating process of forging the rod ends may be dispensed with in favor of an altogether less complex, less energy-intensive assembling process.

Also, as represented in FIG. 5 in an exploded view, the sockets 11 may be inserted or introduced respectively into holes 12 in the intermediate area 8 and subsequently be connected with the intermediate area 8 in a further connecting process, for example, in a riveting process, screwing process, bonding process, welding process, soldering process, etc. Thus, it is also possible to provide a substance-to-substance bond and/or a frictional connection and/or a positive-locking connection between the intermediate area 8 and the sockets 11. In this case, only the support area 7 with the intermediate area 8 will be manufactured one-piece in one of the aforementioned manufacturing processes.

The fastening area 9 with the sockets 11 serves to receive one or more rods 3, depending on how many rods 3 per fastener 6 are to be secured, which will depend on the use of the rod belt 1. Accordingly, rod arrangements 20 with merely a single rod 3 (single rod, see FIG. 6), two rods 3 (twin-rod, not shown), three rods 3 (triple-rod, see FIGS. 1 through 5) or even more than three rods 3 per fastener 6 may be provided, each rod 3 being held via a single socket 11 on the intermediate area 8 of the fastener 6 and, emanating from there, extending in the longitudinal direction L. However, it may also be provided that a plurality of such sockets 11 are combined to a whole socket (not shown) and the whole socket affixed to the intermediate area 8. Then, in this whole socket, a plurality of rods 3 can be received spaced apart from one another in a transverse direction Q (each via insertion openings 13 spaced apart in a transverse direction Q).

In the case of two or more rods 3 the intermediate area 8 which forms the transition between the support area 7 and the fastening area 9 is extended with its lateral surface 8*a* in the transverse direction Q or, respectively in the direction of movement R of the belt 2 across a large area in the manner of a strip or plate so as to be able to hold a plurality of sockets 11 side by side in a transverse direction Q and spaced apart (or a larger whole socket). In the case of only a single rod 3, however, the intermediate area 8 with its lateral surface 8*a* exhibits an expansion in a transverse direction Q which, for example, approximately corresponds to a socket diameter D11 (outer diameter) of the socket 11 (or a little wider), as shown in FIG. 6 by way of example.

Consequently, it is possible to determine a rod pitch TS via the constructional design of the strip-type intermediate area 8 and the fastening are 9. When such a fastener 6 receives two or more rods 3, it is possible to attain a rod pitch TS between the individual rods 3 that is smaller than the cam pitch TN between the individual cams 4,5 on the upper side on the upper side (and on the lower side) (see FIGS. 1, 2). When there is only one rod 3 per fastener 6, however, the rod pitch TS corresponds to the cam pitch TN of the belt 2.

By using a socket 11 in the fastening area 9 it is possible to optimize the transition to the rods 3, resulting in a variety of advantages, depending on the design of the rods 3 and the sockets 11:

For one thing, the attachment of the rods 3 can be optimized. Compared to a fixation only on the intermediate area 8 (as in the state of the art) a socket 11 (or whole socket) projecting away from the intermediate area 8 in the longitudinal direction L provides a more robust or, respectively more stable reception and, therewith a more optimum fixation in the event of occurring bending moments, in particular, in the case of a socket length L11 of, for example, between 5 mm and 30 mm, preferably 15 mm. The end side of the rod 3 can be inserted into such a socket 11 in an insertion opening 13 contained therein up to an insertion depth ET. Hereby, the insertion depth ET corresponds to at least one half, preferably at least two thirds, of the socket length L11, i.e., at least 2.5 mm, preferably at least 7.5 mm or more.

Figure 7A:
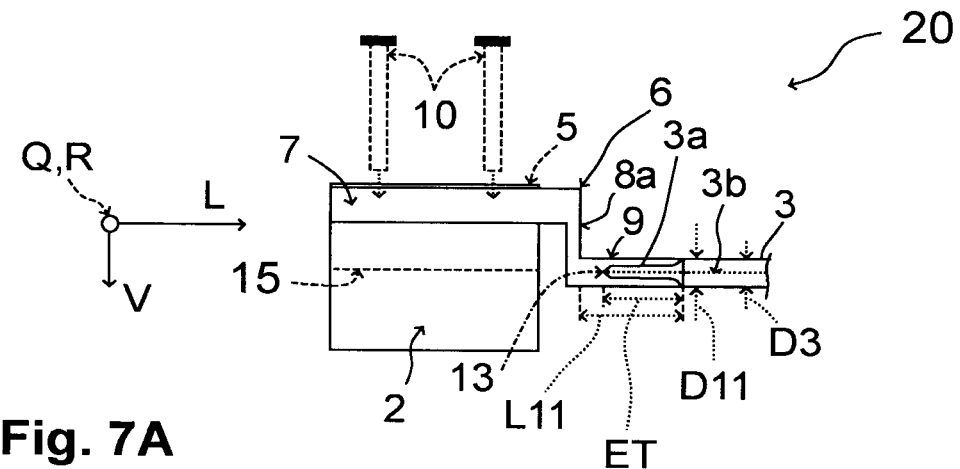
Figure 7B:
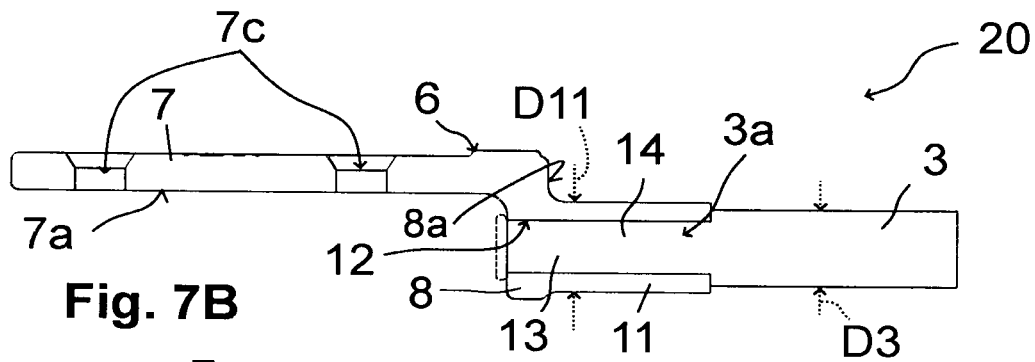

Hereby, the rods 3 may also additionally protrude with such a socket 11 at the end side into holes 12 in the intermediate area 8 and be additionally affixed to the intermediate area 8 by virtue thereof, for example, by means of a rivet connection or similar, as indicated by the dotted line in FIG. 7B. This additionally serves to attach the respective rod Stab 3 on the angled-off intermediate area 8 in a manner axial fixed and/or rotation-proof. The socket 11 then additionally guarantees that the bending moments acting on the rods 3 are efficiently deflected and thereby securing the long-term attachment.

Preferably, the inserted rod 3 is additionally fastened in the insertion opening 13 of the socket 11, in particular, when no additional fixation on the intermediate area 8 is provided. The attachment in the socket 11 is made, for example, by clamping or grouting respectively or, respectively shrinking, bonding, welding, or similar. It is also possible to screw in the rod 3, where the insertion opening 13 will then have a corresponding interior thread for this purpose.

Furthermore, such a socket 11 allows optimization of the temperature transfer between the rods 3 and the fastener 6 or the belt 2, because the sockets 11 can efficiently absorb and deflect higher temperatures so that the rods 3 inserted therein heat up less thereby being thermally stressed to a lesser extent. This may affect the material selected for the rods 3, where, for example, glass fiber or plastics may be used as material to save weight. In principle, however, steel may be used also.

Moreover, by virtue of such a socket 11 the transition between the fastener 6 and the respective rod 3 may be designed more variable in that the socket 11 is made correspondingly specific to the application. Thus, as described already, the insertion depth ET or the socket length L11 respectively may be pre-determined depending on the application so as to attain a desired stability or robustness of the transition. Furthermore, even the shape of the insertion opening 13 may be adapted to the desired shape of the rod 3 or the rod Stab end 3a respectively.

In the simplest case the socket 11 may be a hollow cylinder in shape, as shown in FIG. 4, 5 or 6, so that the insertion opening 13 exhibits an insertion diameter D13 consistent across its length. Hereby, the insertion diameter D13 approximately corresponds to the rod D3 of the rod 3 or, respectively, this is only slightly wider, so as to attain frictional connection between them already on insertion. In this embodiment, the respective rod 3 exhibiting, for example, a rod diameter D3 between 5 mm and 18 mm will no longer require an adaptation at the end side to be affixed on the socket 11 via the insertion opening 13, and this minimizes manufacturing cost.

As shown in FIG. 7A in a sectional view, however, the insertion opening 13 in the socket 11 may have a different shape with an insertion diameter D13 varying across the length, for example, tapered towards the intermediate area 8. In this embodiment, the rod 3 must be "sharpened" at its rod end 3a in a manner correspondingly complementary thereto so that the rod diameter D3 in the region to be inserted decreases accordingly towards the end face. Other shapes of the insertion opening 13 and complementary shapes of the rod end 3a are also possible, for example, a cylindrical pin 14 at the rod end 3a, as shown, e.g., in FIG. 7B or 7C. This cylindrical pin 14 may, as indicated by a dotted line in FIG. 7B, also protrude right into holes 12 in the intermediate area 8, to then be used to create a rivet connection on the end side, via which the respective 3 is affixed to the angled-off intermediate area 8 axially and rotation-proof.

Figure 7C:
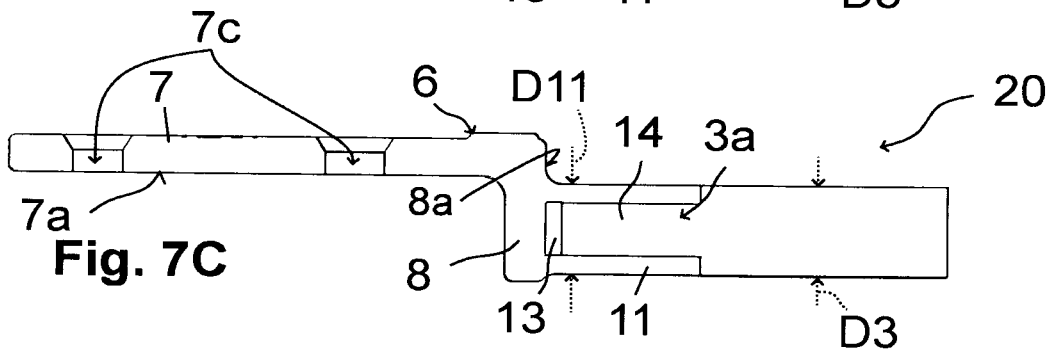
Figure 7D:
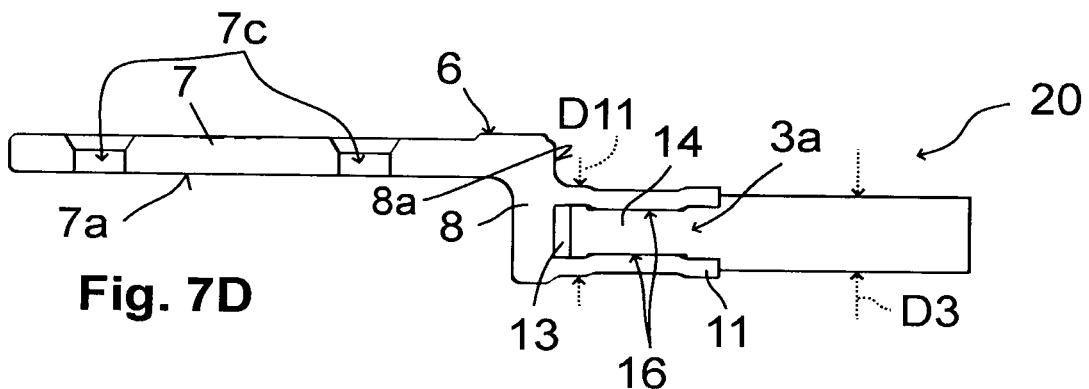

To allow for a secure fixation of the rod 3 in the socket 11, additionally, a recess 16 may be formed in the cylindrical pin 14 at the rod end 3a, as shown in FIGS. 7D and 7E. By appropriate deforming the wall of the socket 11 can be brought to engagement in this recess 16 so as to hold the rod 3 on the socket 11 in the axial direction and possibly even rotation-proof.

In FIGS. 7A, 7C and 7E it is additionally provided that the socket diameter D11 if the socket 11 corresponds to the rod diameter D3 of the rod 3 in the area outside the insertion opening 13. This makes the rod 3 directly merge into the socket 11 so that on the surface no edges or steps are created between the rod 3 and the fastener 6 on which dirt or similar may be deposited in operation of the rod belt 1. This also creates the impression of the fastener 6 being one-piece with the respective rod 3.

The above-described construction of the fastener 6 further allows, in a simple manner, a fixation of the installation position of the rods 3 or the plane respectively, in which the rods 3 are positioned on the finished rod belt 1. Hereby, it is provided that the intermediate area 8 is angled downwards from the support area 7 so that the sockets 11 arranged thereon lie in a plane below the support area 7, as shown in the FIGS. 8A, 8B by way of example. Thereby, the rods 3 received in the sockets 11 are positioned on the rod belt 1 in a plane lying below the belt upper side 2b.

According to FIG. 8A the intermediate area 8 extends in the vertical direction V, for example, so far down in the direction of the belt underside 2c that the socket(n) 11 in the fastening area 9 and therewith also the longitudinal axes 3b of the respective rods 3 lie in the plane of the neutral fiber 15 of the belt 2. According to FIG. 8B the intermediate area 8 extends from the support area 7 downwards in the vertical direction V in such a way that the socket(n) 11 or, respectively, the longitudinal axis (axes) 3b of the rod or rods 3 lie in a plane below the neutral fiber 15 of the belt 2.

Another or a further option of determining the installation position or, respectively, the plane of the rods 3 on the rod belt 1 is to deform or, respectively, offset the socket(s) 11 starting from the intermediate area 8, as shown in the FIGS. 9A, 9B, 9C by way of example. Hereby, the socket 11 still projects away from the intermediate area 8 or, respectively, from the lateral surface 8a perpendicularly in longitudinal direction L, but then changes its direction to then point in the longitudinal direction L again at the end. Thus, the intermediate area 8 can always be identically angled downwards and the shape of the deformation or, respectively, offset 17 is selected such that the longitudinal axis 3b of a rod 3 inserted in the deformed or, respectively, offset socket 11 lies in the plane of the neutral fiber 15 of the belt 2 (s. FIG. 9A) or above (see FIG. 9B) or below it (see FIG. 9C). By the way, this may also be combined with a correspondingly adapted extension and positioning of the intermediate area 8, for example, according to the embodiments of FIGS. 8A, 8B.

Hereby, the embodiments in FIGS. 8A, 8B and 9A, 9B, 9C bear the advantage that always the same rod 3 can be used for each installation position and, therefore, no adaptation or deformation of the rod 3 itself is required. This reduces manufacturing cost because the fastener 6 can usually be manufactured more easily than the rods 3. In principle, however, a deformed or offset rod 3 may be used instead to determine the respective installation position on the rod belt 1.

According to FIG. 10, a further embodiment for the attachment of the rods 3 onto an inner belt 2 is shown. In the FIG. 2 described previously, it is provided that the support area 7 transitional one-piece into an intermediate area 8 on both belt outer sides 2a of the inner belt 2. This allows the rods 3 to be held securely in the respective installation position via the sockets 11 on both sides of the inner belt 2, where in the area of the inner belt 2 there usually are higher bending moments which can be sufficiently deflected via the sockets 11. In this variant of the fasteners 6 the design embodiments mentioned above will be utilized also.

In the modified embodiment according to FIG. 10, the support areas 7 of two fasteners 6, each having only a single intermediate area 8, are placed on top of one another in a manner twisted about the vertical axis and jointly attached to the inner belt 2 by means of appropriate fastening means 10, for example, rivets or similar. Hereby, the fastening means 10 push through or penetrate the two perforated support areas 7 and also the inner belt 2.

Hereby, the two fasteners 6 are placed on top of one another in such a way that an intermediate area 8 is arranged parallel to each of the belt outsides 2a of the inner belt 2, via which the rods 3 can be attached via the sockets 11 on both sides of the inner belt 2. Thus, two of the above-described fasteners 6 are combined. For the purpose of attaining an approximately identical installation position of the rods 3 on both sides of the inner belt 2 or, respectively, approximately aligned longitudinal axes 3b of the rods 3, the intermediate area 8 with the lateral surfaces 8a of the fastener 6 lying on top exhibits a wider extension in the vertical direction V than the intermediate area 8 of the fastener 6 lying below. This is because the fastener 6 lying on top is displaced in the vertical direction V about the thickness of the support area 7 of the fastener 6 lying below, which, ideally, is compensated by a correspondingly wider vertical extension of the intermediate area 8 or, respectively, the lateral surface 8a of the fastener 6 lying on top. Hereby, tolerances of, for example, up to 3 mm between the longitudinal axes 3b of the rods 3 of opposite orientation are acceptable.

In order to avoid relative movement of the two overlying fasteners 6 in the direction of movement R of the belt 2 and/or in the longitudinal direction L of the fasteners 6 or rods 3 respectively, the surfaces 7b of the two support areas 7 facing each other are designed non-planar. Thus, the surfaces 7b of the two support areas 7 facing each other may be, for example, as shown in FIG. 10A in a sectional view, arched complementary to one another (concavely/convexly) in the direction of movement L of the belt 2, and/or, as shown in FIG. 10B, conically tapered in the longitudinal direction L, or. as shown in FIG. 10C, graduated. Additionally, force peaks may be quenched via a groove and pin combination 18, shown only in FIG. 10A representative for all cases.

The embodiments shown in FIGS. 10, 10A, 10B, 10C may also be utilized for sockets 11 made one-piece with the intermediate area 8 (see FIG. 11A), rod ends 3b riveted onto the intermediate area 8 (see FIG. 11B) and even for other shapes of rod ends 3a and sockets 11. Thus, the above-mentioned variants are applicable also to this overlying embodiment.

This way of attaching rods 3 to an inner belt 2 is also conceivable for fasteners 6 which, in contrast to the above-described embodiment, have no socket 11. Accordingly, as shown in FIG. 11, the rods are affixed directly to the intermediate area 8 made one-piece with the support area 7, for example, using a rivet connection at the end. In such a variant, too, the fasteners 6 may be placed on top of one another and attached to the inner belt 2 via appropriate fastening means 10 in a manner correspondingly twisted and optionally combined with the above-described embodiments shown in FIGS. 10A, 10B, 10C.

LIST OF REFERENCE NUMERALS

1 rod belt
2 belt
2a outer side of belt
2b upper side of belt
2c lower side of belt
3 rod
3a rod end
3b longitudinal axis of the rod 3
4 cam on the underside
5 cam on the upper side
6 fastener
7 support area
7a support side
7b surfaced facing one another
7c perforation
8 intermediate area
8a lateral surface
9 fastening area
10 fastening means
11 socket
12 holes
13 insertion opening
14 cylindrical pin
15 neutral fiber of the belt 2
16 recess
17 cranked section
18 groove and pin combination
20 rod arrangement
A distance
D3 rod diameter
D11 socket diameter
D13 insertion diameter
ET insertion depth
L longitudinal direction
L11 socket length
Q transverse direction
R direction of movement
TA cam pitch
TS rod pitch
V vertical direction

The invention claimed is:

1. Rod belt (1) for agricultural machines comprising
at least three pull-resistant, elastic and continuous (endless) belts (2) running parallel to one another extending in a direction of movement (R), where an inner belt (2) runs in-between two outer belts (2),
fasteners (6) connected to the belts (2), and
rods (3) arranged perpendicular to the direction of movement (R) and parallel to one another, each running in-between two of the belts (2), the rods (3) each being held at their rod ends (3a) by fasteners (6) connected to the respective belts (2),
the respective fastener (6) comprising at least:
a support area (7) extending in a longitudinal direction (L) via which the fastener is attached to the respective belt (2) of the rod belt (1), and
an intermediate area (8) made one-piece with the support area (7) on which at least one rod Stab (3) is held via its rod end (3a) directly and/or via an additional socket (11),
characterized in that
two of the fasteners (6) are arranged with their support areas (7) overlying each other on the inner belt (2) of the rod belt (1) in such a way that the intermediate areas (8) on the two overlying support areas (7) lie adjacent to different belt outsides (2a) of the inner belt (2), and the rods (3) held thereon extent in opposite directions starting from the inner belt (2).

2. Rod belt (1) according to claim 1, characterized in that the intermediate areas (8) of the two overlying fasteners (6) are preferably designed non-circular and/or eccentrically fitted onto the respective support area (7) and are angled downwards in the vertical direction (V), preferably perpendicularly, starting from the respective support areas (7) with which they are connected as one-piece.

3. Rod belt (1) according to claim 2, characterized in that longitudinal axes (3b) of the rods (3) held on the respective intermediate area (8) directly and/or via the respective socket (11) run below the support area (7) of the respective fastener (6) as well as below a belt upper side (2b) of the belt (2), where the longitudinal axes (3b) of the respectively held rods (3) run preferably in the plane of a neutral fiber (15) of the inner belt (2) or above or below the plane of the neutral fiber (15) of the inner belt (2), in particular, in an area of +/−2 mm around the neutral fiber (15).

4. Rod belt (1) according to according to claim 1, characterized in that the intermediate areas (8) of the two overlying fasteners (6) are arranged on the respective support area (7) in such a way that at least two of the rods (3) held by them and extending in opposite directions are approximately aligned, where the longitudinal axes (3b) of the rods (3) extending in opposite directions differ from each other by a maximum of 3 mm.

5. Rod belt (1) according to according to claim 1, characterized in that surfaces (7b) of the overlying support areas (7) facing each other are in contact with one another, preferably with precision fit.

6. Rod belt (1) according to claim 5, characterized in that surfaces (7b) of the overlying support areas (7) facing each other are arched towards one another, preferably arched perpendicular to the longitudinal axis (L).

7. Rod belt (1) according to claim 5, characterized in that a groove and pin combination (18) is formed on the surfaces (7b) facing each other.

8. Rod belt (1) according to claim 5, characterized in that the surfaces (7b) of the overlying support areas (7) facing each other are conically tapered in the longitudinal axis (L) in a manner complementary to each other.

9. Rod belt (1) according to according to claim 5, characterized in that the surfaces (7b) of the overlying support areas (7) facing each other are graduated in the longitudinal axis (L) in a manner complementary to each other.

10. Rod belt (1) according to according to claim 1, characterized in that the overlying support areas (7) of the two fasteners (6) are arranged in-between two cams (5) on the upper side of the inner belt (2) and are attached to the inner belt (2) using fastening means (10), for example, rivets, penetrating the two overlying support areas (7) and the inner belt (2).

11. Rod belt (1) according to according to claim 1, characterized in that a distance (A) between the respective belt outside (2a) of the inner belt (2) and at least one intermediate area (8) of the two overlying fasteners (6) is a maximum of 10 mm, or at least one intermediate area (8) of the two overlying fasteners (6) is in contact with the respective belt outside (2a).

12. Rod belt (1) according to according to claim 1, characterized in that the rod end (3a) of the respective rod (3) is axially and in a rotation-proof manner affixed to the intermediate area (8), for example, by using a rivet connection.

13. Rod belt (1) according to according to claim 1, characterized in that a fastening area (9) protrudes in the longitudinal direction (L) away from the intermediate area (8), the fastening area (9) being formed by at least one socket (11) having an insertion opening (13) extending across an insertion depth (ET) in the longitudinal direction (L), in into which the rod end (3a) of the rod (3) is inserted.

14. Rod belt (1) according to according to claim 1, characterized in that at least two rods (3), preferably at least three rods (3), are received on one fastener (6) via the respective intermediate area (8), where a distance between the received rods (3) is selected depending on an intended rod pitch (TS) between the rods (3) on the rod belt (1), the rod pitch (TS) being smaller than a cam pitch (TN) between cams (4) on the underside and/or cams (4) on the upper side on the respective belt (2).

15. Rod belt (1) according to according to claim 1, characterized in that the respective fastener (6) is made totally or partially in a subtractive or additive manufacturing process, preferably using a metal material or a thermoplastic, or thermosetting polymer, for example in a milling process or 3D printing process, or as a molded part, preferably from a metal material or of a thermoplastic, or thermosetting polymer.

* * * * *